United States Patent
Bodin

(10) Patent No.: US 7,948,357 B2
(45) Date of Patent: May 24, 2011

(54) FREE-SPACE GESTURE RECOGNITION FOR TRANSACTION SECURITY AND COMMAND PROCESSING

(75) Inventor: William Kress Bodin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/054,704

(22) Filed: Mar. 25, 2008

(65) Prior Publication Data

US 2008/0230598 A1 Sep. 25, 2008

Related U.S. Application Data

(63) Continuation of application No. 10/046,953, filed on Jan. 15, 2002, now Pat. No. 7,394,346.

(51) Int. Cl.
  *G05B 19/00* (2006.01)
(52) U.S. Cl. ....... 340/5.51; 340/10.4; 340/5.2; 340/5.81
(58) Field of Classification Search ................ 340/5.51, 340/10.1, 10.4, 5.2, 539.23, 5.81, 5.26; 715/863, 715/700; 345/157, 158
See application file for complete search history.

(56) References Cited

U.S. PATENT DOCUMENTS

| | | | |
|---|---|---|---|
| 3,580,058 A | 5/1971 | Lynnworth | |
| 4,988,981 A | 1/1991 | Zimmerman et al. | |
| 5,361,871 A | 11/1994 | Gupta et al. | |
| 5,406,271 A | 4/1995 | Sonnendorfer et al. | |
| 5,539,393 A | 7/1996 | Barfod | |
| 5,565,858 A | 10/1996 | Guthrie | |
| 5,664,110 A | 9/1997 | Green et al. | |
| 5,818,364 A | 10/1998 | Hintzman et al. | |
| 5,859,414 A | 1/1999 | Grimes et al. | |
| 5,903,454 A * | 5/1999 | Hoffberg et al. ................ 700/83 |
| 5,920,261 A | 7/1999 | Hughes et al. | |
| 5,970,474 A | 10/1999 | LeRoy et al. | |
| 6,310,629 B1 | 10/2001 | Muthusamy et al. | |
| 6,421,453 B1 | 7/2002 | Kanevsky et al. | |
| 6,556,190 B2 | 4/2003 | Fleck et al. | |
| 6,634,560 B1 | 10/2003 | Grabau | |
| 6,661,425 B1 | 12/2003 | Hiroaki | |
| 6,750,848 B1 | 6/2004 | Pryor | |
| 7,394,346 B2 * | 7/2008 | Bodin .......................... 340/5.51 |
| 2002/0071277 A1 | 6/2002 | Starner et al. | |
| 2004/0030601 A1 | 2/2004 | Pond et al. | |

OTHER PUBLICATIONS

USPTO; examination correspondence in U.S. Appl. No. 10/046,953, now issued as 7,394,346, originally filed on Jan. 15, 2002 by William Kress Bodin.

* cited by examiner

*Primary Examiner* — Vernal U Brown
(74) *Attorney, Agent, or Firm* — Robert H. Frantz; Libby Z. Toub

(57) ABSTRACT

A sensor panel for detecting a free-space gesture signature conducted with a gesturing instrument by providing a panel mounted on a controlled system with multiple gesturing sensors in a two-dimensional arrangement to detect movement of a gesturing instrument, and an array of infrared ("IR") type sensors adapted to detect movement of gesturing instruments which are distinguishable by heat; determining a sensor sequence from a series of sensor detection events responsive to movement of a gesturing instrument within the sensor proximity; correlating the sensor sequence to a predetermined sequence in order to authenticate a user of the gesturing instrument: and responsive to authentication of the user, authorizing a physical security action, wherein the a gesturing sensors comprise a combination of two or more sensors selected from Radio Frequency Identification type sensors acoustic sensors, acoustic type sensors adapted to detect movement of acoustic-reflective gesturing instruments, and infrared type sensors.

1 Claim, 4 Drawing Sheets

*Prior Art*

FREE-SPACE GESTURE RECOGNITION FOR TRANSACTION SECURITY AND COMMAND PROCESSING

CROSS-REFERENCE TO RELATED APPLICATIONS (CLAIMING BENEFIT UNDER 35 U.S.C. 120)

This application is a continuation of U.S. patent application Ser. No. 10/046,953, filed on Jan. 15, 2002 now U.S. Pat. No. 7,394,346, by William Kress Bodin.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

U.S. patent application Ser. No. 10/046,953, filed on Jan. 15, 2002, by William Kress Bodin, is incorporated by reference in its entirety, including figures.

BACKGROUND OF THE INVENTION

1. Field of the Invention

This application is a continuation of U.S. patent application Ser. No. 10/046,953, filed on Jan. 15, 2002, by William Kress Bodin. This invention relates to the arts of user identification, such as personal identification numbers and signature recognition.

2. Description of the Related Art

When making a transaction using a credit account, credit card, or automatic teller machine ("ATM"), many systems require users to identify themselves using a unique number, such as a personal identification number (PIN), or to place their signature onto a paper slip or into a digitizing tablet. Methods for verifying a user's PIN from data stored on the magnetic strip of a card or via a transaction over a computer network are well known. Additionally, methods for recognizing a digitized signature are also well known in the art.

PINs are highly subject to fraud, however. For example, it is well known in the law enforcement community that many identity thieves simply sit in a position within a public space such as an airport terminal where they can view an ATM or pay phone. Then, when an unsuspecting user keys in his or her PIN, the thief simply watches the entry, sometimes with the aid of binoculars. In the case of a phone credit card, the thief may also be able to watch and learn the user's account number, thereby directly enabling him or her to use the victim's account. In the case of an ATM or credit card, the thief may then proceed to steal the victims wallet or purse to obtain the card.

Signature recognition has promised greater security, and many point-of-sale (POS) systems have been equipped with electronic tablets upon which a credit card or ATM card user must sign in order to complete a transaction. However, due to the limitations in accuracy and the shear volume of data needed to store many reference copies of signatures for card holders, as well as the intense computational capabilities needed to accurately characterize and recognize a human signature, these POS systems are rarely used to actually perform signature recognition. Rather, they have been used to reduce the physical storage requirements for a retailer to maintain paper copies of signed credit slips. Instead, copies of the digitized signatures are kept electronically for a period of time in case they are needed during a credit card dispute resolution investigation.

Recently, another consumer identification device has been introduced into the market place, most notably in the "pay-at-the-pump" retail fuel market. These small devices hang on a key chain or ring, and contain a small integrated circuit ("IC") similar in technology to those employed for theft prevention in retail stores. As illustrated in FIG. 1, the system (1) consists of a key fob (11) device, which is usually hand held by a user (12). The point-of-sale system (or other system requiring user identification such as an automatic door lock) has a radio-frequency ("RF") transparent panel (10), behind which is concealed a transmitter-receiver "sensor" (13) element such as an antenna element. The transmitter-receiver (13) is interfaced to a Consumer Identification Unit ("CIDU") (14), which is usually microprocessor based. To improve performance, a large panel may be equipped with multiple sensors whose signals are summed by the CIDU.

In practice, the consumer places the key fob (11) within a sensitivity proximity P of the panel (10) when he or she wishes to authorize a transaction. A low-power RF signal which is constantly emitted by the sensor (13) is received by the IC in the key fob (11), which induces enough energy from the emitted signal to power the IC and to transmit a unique code or number which is associated with the consumer or user. This signal is received by the CIDU, decoded, and the user's identity is determined (either in a local datastore or via a look-up over a computer network (15)). The transaction can then be processed as is done in the art currently, either by requesting transaction authorization from a credit server over a computer network (15), or performing the authorization locally.

This technology can be applied to a number of problems requiring quick identification of a user. For example, the same system can be applied to the controls for an automatic door lock, and the IC device can be carried in a key fob or a ID "badge", thereby allowing the user to approach the door, place the key fob or badge within proximity of the access control panel, and the system automatically verifies authorization to enter the door and unlocks the door.

However, this RF ID process does not actually verify that the person who possesses the RF ID device is the actual user associated with the device. For example, if a woman's purse is stolen, the thief may simply use her key fob device to purchase fuel at such a gas pump because the system does not require entry of a signature or PIN. This step is avoided because one key to the marketability of the key fob device is convenience and quickness of completing the transaction—simply "wanding" the key fob past the panel to complete a transaction. Adding a step to enter a PIN number or sign a touch-sensitive pad would make this process less convenient than the standard credit card and ATM process previously in use.

As such, this type of RF ID technology has seen limited adoption by the industry, primarily limited to applications where purchase amounts are limited by some practical factor. Gasoline purchases, for example, rarely exceed $50 for a typical retail customer, and as such, the increased risk of fraudulent use of the devices is not associated with tremendous loss when measured in dollar value.

Therefore, there is a need in the art for a system and method which allows the convenience of the RF ID system to be securely employed in applications which authorize transactions of greater significance in order to promote their use in a widespread manner. Further, this new system and method must provide a user-unique identification step which does not decrease the convenience or speed with which the transaction can be completed (when compared to the current RF ID process), does not significantly increase the processing requirements of a CIDU to perform the decoding and user identification functions, and preferably allows a single user to define his or her own identification signature or multiple signatures.

BRIEF DESCRIPTION OF THE DRAWINGS

The following detailed description when taken in conjunction with the figures presented herein provide a complete disclosure of the invention.

SUMMARY OF THE INVENTION

Figure 1:
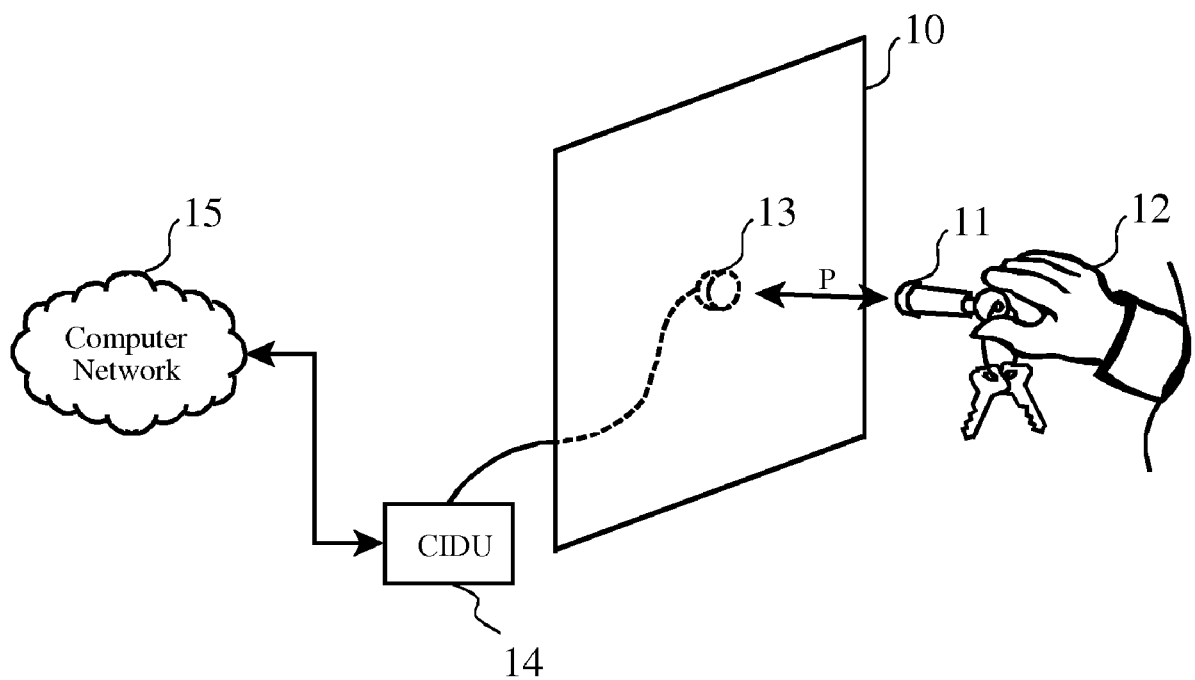
FIG. 1 shows the arrangement of RF ID sensors and key fob systems which are well known in the art.

Embodiments of the present invention provide a sensor panel for detecting a free-space gesture signature conducted with a gesturing instrument by providing a panel mounted on a controlled system with multiple gesturing sensors in a two-dimensional arrangement to detect movement of a gesturing instrument, and an array of infrared ("IR") type sensors adapted to detect movement of gesturing instruments which are distinguishable by heat; determining a sensor sequence from a series of sensor detection events responsive to movement of a gesturing instrument within the sensor proximity; correlating the sensor sequence to a predetermined sequence in order to authenticate a user of the gesturing instrument; and responsive to authentication of the user, authorizing a physical security action, wherein the a gesturing sensors comprise a combination of two or more sensors selected from Radio Frequency Identification ("RFID") type sensors acoustic sensors, acoustic type sensors adapted to detect movement of acoustic-reflective gesturing instruments, and infrared ("IR") type sensors.

Additional embodiments which employ other types of gesturing instruments and sensors, such as passive infrared detectors and acoustic detectors, optionally in combination with RFID technology, are also disclosed.

DETAILED DESCRIPTION OF THE INVENTION

The present invention augments and improves the RF ID technology which is well known in the art. It provides a practical and processing-efficient method of allowing an RF ID holder to define one or more signature "gestures" as a means for enhanced personal identification, without compromising the convenience of the quick and easy use of an RF ID for user identification. Additional embodiments which employ other types of gesturing instruments and sensors, such as passive infrared detectors and acoustic detectors, optionally in combination with RFID technology, are also possible.

One possible method to provide this type of gesture recognition would be to employ any of the well-known gesture recognition algorithms which operate on sequenced digitized video images. Such technology has been developed (and remains in development) for applications such as allowing handicapped access to computer systems for users who cannot operate a standard computer keyboard or mouse. This system, though, typically requires the use of a small electronic camera which sends digital images to a computer for processing. The algorithms themselves are quite computationally intensive, as they first must perform feature extraction (e.g. find a moving hand in an image), track those features, and then recognize the track as a predefined gesture. This type of technology is actually a further application of standard signature recognition, being more computationally intensive and less accurate than normal signature recognition algorithms themselves. Additionally, they require the use of a camera as an input or capture device, which are not prevalent on POS terminals such as cash registers and gas pumps.

For these reasons, the system and method of the present invention represent a practical yet effective solution to the problem of providing user-defined and entered identification gestures using RF ID technologies.

Figure 2:
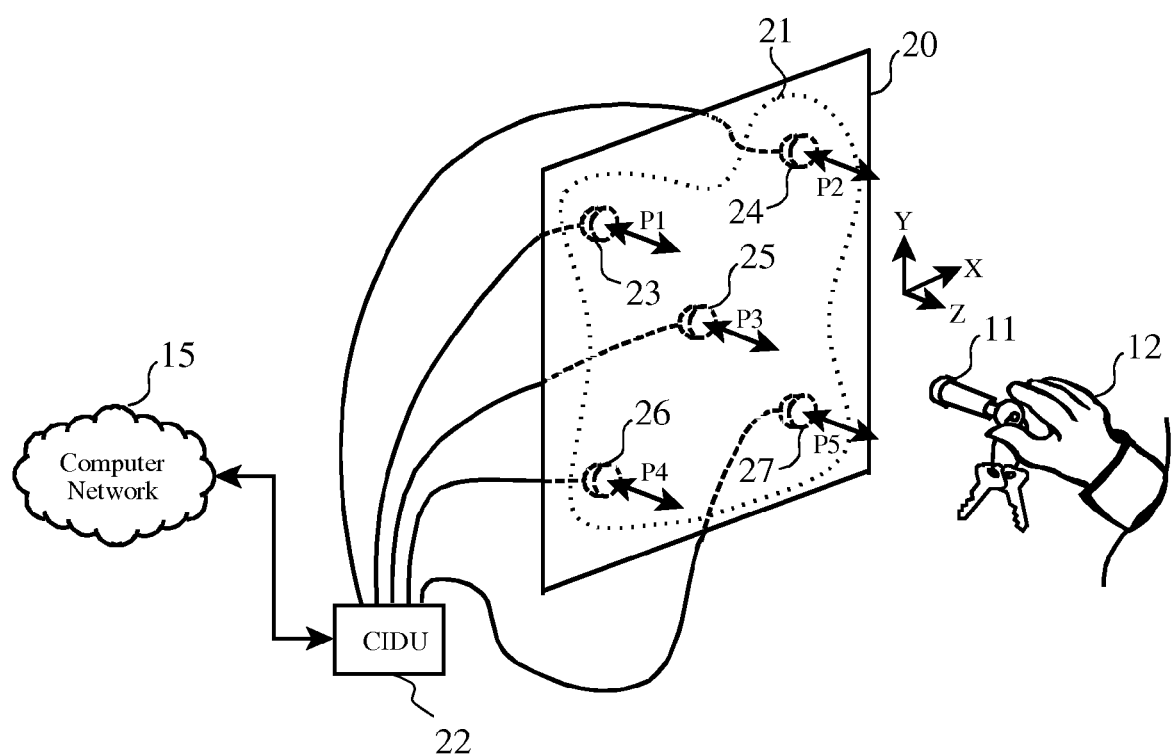
FIG. 2 illustrates on possible arrangement of RF ID sensors according to the invention.

As shown in FIG. 2, the system panel (20) is modified to provide an array of sensors (21) concealed behind the panel, preferably in a weather resistant housing for outdoors applications (e.g. ATMs, gas pumps, exterior door lock controls, etc.). In this example, the panel (20) is equipped with 5 sensors (23 through 27), each of which is independently interfaced to the CIDU. More or less sensors could be used, as the application dictates.

Some systems of the prior art have multiple sensors in their panels, but their signals are summed together and are not independently processed by the CIDU. In either case, the panels and CIDUs of existing systems may be easily retrofitted with the arrangement of the invention.

The CIDU (22) software or logic is enhanced to "snapshot" the sensor data on a timed or sequenced basis from each of the independent sensors. The space in front of the panel (20) can be divided into three axes for reference, such as "x" for lateral or horizontal placement and movement, "y" for vertical placement and movement, and "z" for distance from the panel.

Figure 3A:
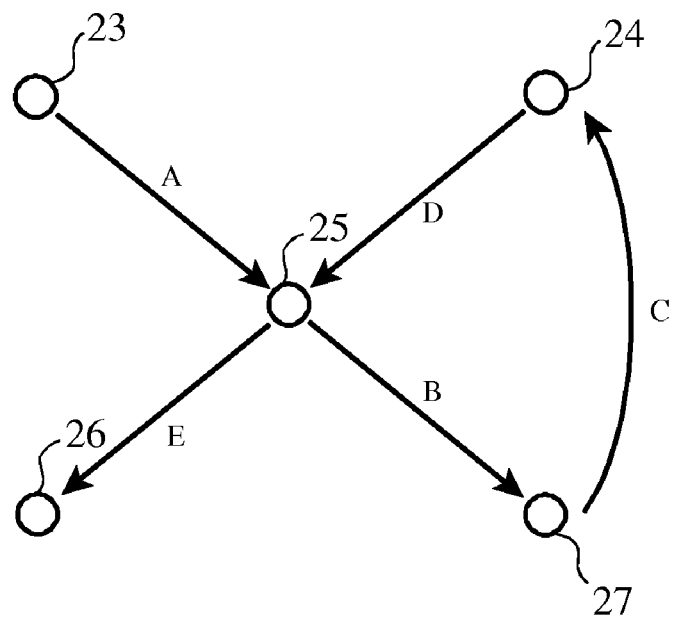
FIGS. 3a and 3b provide example gesture signatures for illustration of the invention.

The user (12) may then perform a two-dimensional (x-y) gesture in front of the panel (20) (in free space), moving the standard RF ID key fob (14) in and out of the reception proximity of the various sensors. For example, one user may have a signature as shown in FIG. 3a, essentially an "X" starting at the upper left corner of the panel, and finishing at the lower left of the panel. In this case, user would move the key fob in a direction congruent with the z-axis (e.g. perpendicular to the panel) to enter the proximity P1 of the upper left sensor (23). Then, keeping the key fob approximately the same distance from the panel in the z-axis, the user moves (A) the key fob (14) towards the center sensor (25), thereby entering the proximity P3, continuing to near the bottom right sensor (27), then upwards towards the upper right sensor (24), down and across the center sensor (25) to the bottom left sensor (26), finally moving the key fob (14) in the z-axis away from the panel (and out of proximity range P4) to complete the signature gesture.

In example, the CIDU detects the sequence of events or signals from the sensors and key fob IC as shown in TABLE 1.

TABLE 1

Example Sequence for Gesture of FIG. 3a

| Time (millisecs) | Event | Sensor |
|---|---|---|
| 000 | RF ID = 9999 | 23 on |
| 100 | RF ID = 9999 | 23 off |
| 150 | RF ID = 9999 | 25 on |
| 210 | RF ID = 9999 | 27 on |
| 240 | RF ID = 9999 | 25 off |
| 300 | RF ID = 9999 | 27 off |
| 340 | RF ID = 9999 | 24 on |
| 390 | RF ID = 9999 | 24 off |
| 420 | RF ID = 9999 | 25 on |
| 480 | RF ID = 9999 | 26 on |
| 550 | RF ID = 9999 | 26 off |

In this example sequence, the gesture is completed in about one-half a second. The sensors and CIDU are preferably adapted to detect such a sequence with similar timing (0.5 to 2 second completion time), in order to allow the user to simply modify a simple one-pass type wanding motion to a relatively quick gesture for his or her personal identification signature.

The CIDU would then perform logical analysis on the time of this sequence, and reduce the signature to a series of detector events such as 23-25-27-24-25-26 in this case. The CIDU logic can account for short breaks in the sequence (gaps between the key fob being lost from one sensor and detected at the next), as well as short overlaps in detection (when two sensors simultaneously detect the same key fob) using simple timing thresholds. For example an overlap or gap of less than 50 msec may be ignored, while a gap of greater than 1000 msec may be considered a termination of the gesture.

This sequence then can be quickly compared to the sequence previously programmed or stored for the user associated with RF ID 9999. It can be readily seen, then, that the user's signature gesture can vary with a considerable amount in the actual placement or strokes and still be properly recognized, as long as the key fob (or ID badge) is moved into the proximity areas of the various sensors in the correct order. Further, but allowing a greater range of timing, the user may gesture quickly or slowly for signature to be recognized. The computational intensity required to detect this gesture signature is reasonable for implementation on an inexpensive embedded microprocessor or microcontroller, as is commonly employed in the present-day CIDU devices.

Once the signature has been detected and determined to be correct, the authorization process (either locally or over a computer network) may proceed. Thus, if an unauthorized person obtains the key fob (or ID badge) and attempts to use it, he must also know and complete the personal signature gesture of the rightful owner, thereby reducing the ability to fraudulently use the device to make purchases, open doors, etc.

Figure 3B:
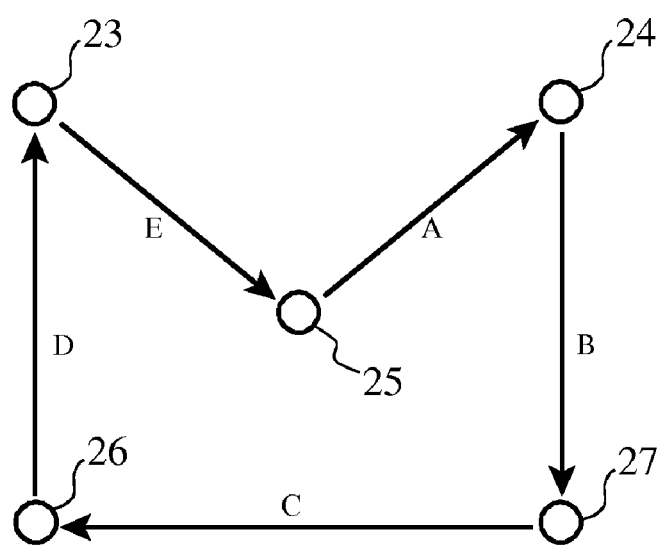

FIG. 3b provides another example of an alternate signature which would generate a signature value of 25-24-26-27-23-25, which could be used as a second signature gesture for the same user of our first example (RF ID=9999), or the signature gesture for another user.

According to the preferred embodiment, the user may initialize and change his or her signature gesture(s) at will by simply entering an initial signature gesture (similar to a default PIN), and then making his or her new gesture, which would then be captured and stored for future reference by the CIDU and/or networked servers. Other methods of initializing or changing a gesture may be to log on to a web site which provides the user with a virtual drawing tablet, upon which he or she may use a mouse or pointer to draw the gesture.

Figure 4:
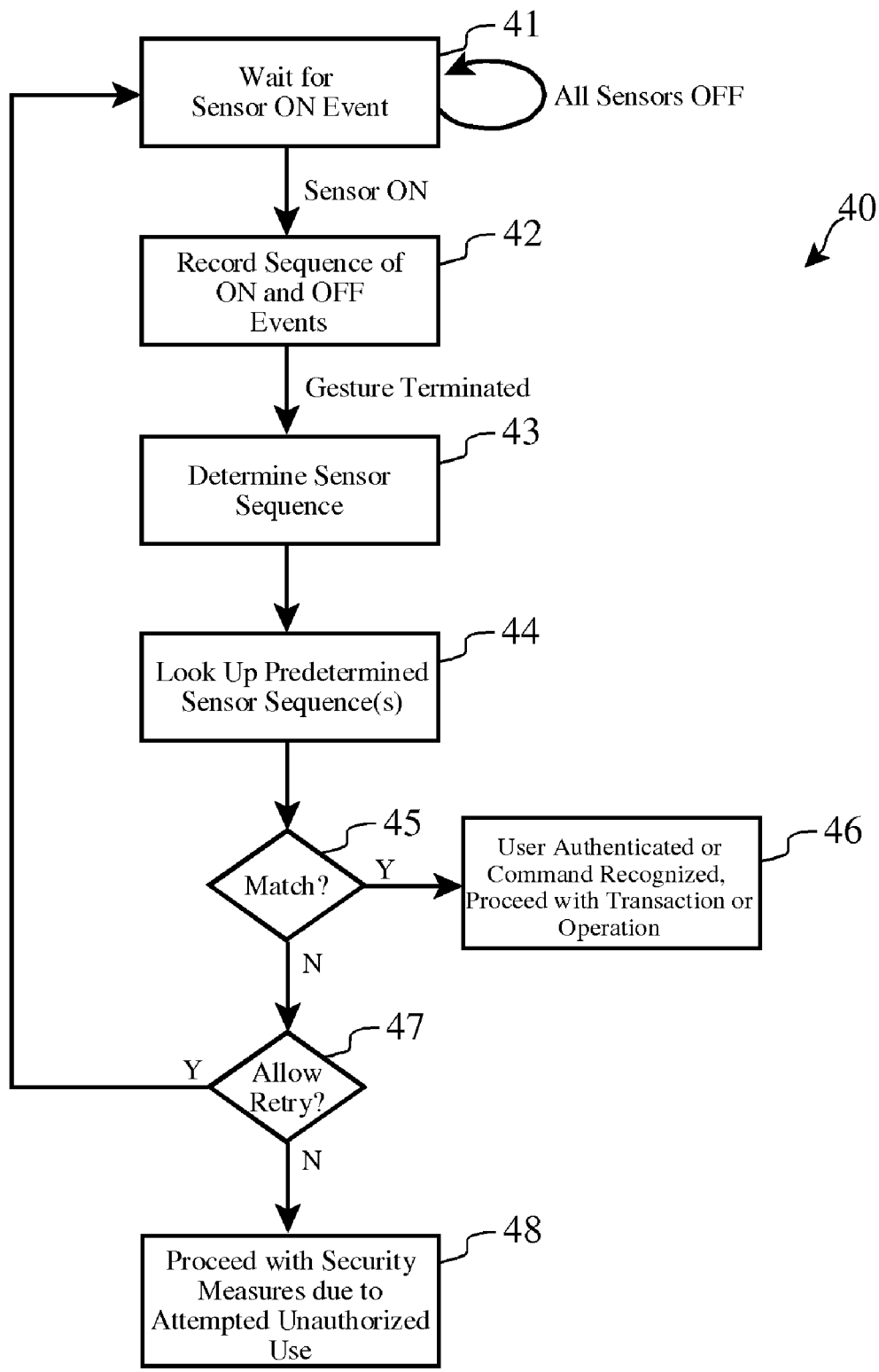
FIG. 4 sets forth the logical process of the invention.

The fundamental logical process (40) implemented by the CIDU is presented in FIG. 4. The CIDU waits for the initiation of a signature gesture (40), which is indicated by a sensor ON event. Then, the CIDU records (42) and timestamps the sequence of sensor ON and OFF events, as well as the RF ID value of the key fob or ID badge which is in the proximity of the sensors.

When the gesture has terminated, such as the detection of all sensors being OFF for a minimum amount of time, the CIDU then reduces (43) the recorded event list to a sensor sequence which represents the general movement points in the signature gesture.

This sensor sequence is then compared (44) to the predefined sequences associated with the RF ID, either by accessing a local data store of sensor sequences or by accessing a remote data store (e.g. a networked server). If the sequence matches (45) one of the predefined sequences for that RF ID, the user is considered authenticated and normal transaction processing and authorization proceeds (46).

However, if the sequence does not match a predefined sequence for that RF ID, the user may be prompted and allowed to re-enter the gesture (47), or the CIDU may notify the appropriate systems such as credit card servers that the authentication process has failed so that appropriate security measures may be taken (e.g. disabling the key fob, contacting the owner, etc.).

It will be readily recognized by those skilled in the art that this system and method can be realized in many ways which vary in details from the examples presented herein without departing from the spirit and scope of the present invention.

For example, more or less sensors may be used in other arrangements on a panel to allow for more precise gesture detection or less expensive devices. Further, additional logic may be applied to the gesture detection and recognition process, such as more sophisticated timing analysis, to improve the security performance of the system.

In still other embodiments, additional sensor technologies may be employed to sense the free space signature gesture. For example, an array of acoustic sensors could be used in place of the RF sensor elements such that a gesture made with a hand or finger could be detected and decoded. In another example, an array of passive infrared detectors ("PIR") may be used to detect the movement of a warm gesturing instrument such as a human hand.

Additionally, the process may be used for other security applications than the examples given (POS and door locks). For example, a retail theft system could be modified to provide the multisensor panel near the exit "gates" of the RF ID anti-theft system. An authorized customer or supplier could then, upon approach of the gate, temporarily disable the gate by performing an authorized gesture signature using an RF ID near the panel. This could allow suppliers to move freely but securely through "customer" doors as well as "back doors" and "delivery doors" of retail establishments, as well as allow preferred customers of a retail establishment to bypass the normal "check out" procedure by simply identifying himself upon exit (e.g. the theft system would detect the items in his or her possession and automatically add them to the preferred customer's account balance).

In other applications, the invention could be mounted to a wheelchair with a wearable personal computer ("PC"), or incorporated into pay phones and automatic teller machines ("ATM") to allow a physically challenged user to use different gestures for commands and identity input. Many physically challenged persons are capable of making large scale motor movements, such as a wave of the arm or hand, but are not able to complete movements which require fine motor skills, such as typing on a keyboard, pushing buttons or writing with a pen. By associating a plurality of free space gestures with a plurality of commands, a physically challenged user could effectively operate a pay phone, ATM, or PC.

Therefore, the scope of the invention should be determined by the following claims.

What is claimed is:

1. A method for detecting a free-space gesture signature conducted with a gesturing instrument, the method comprising:

providing a panel mounted on a controlled system, the panel having a plurality of gesturing sensors in a two-dimensional arrangement, each sensor being adapted to detect a gesturing instrument within a proximity of a sensor, each sensor having an independent detection event signal, wherein the sensors comprise at least one type of sensor selected from a group consisting of an array of acoustic type sensors adapted to detect movement of acoustic-reflective gesturing instruments, and an array of infrared ("IR") type sensors adapted to detect movement of gesturing instruments which are distinguishable by heat determining a sensor sequence from a series of sensor detection events responsive to movement of a gesturing instrument within the proximity of the plurality of sensors;

correlating the sensor sequence to a predetermined sequence in order to authenticate a user of the gesturing instrument; and responsive to authentication of the user, authorizing a physical security action, wherein the providing a plurality of gesturing sensors comprises providing a combination of two or more types of sensors selected from a group consisting of Radio Frequency Identification (RFID) type sensors acoustic sensors, acoustic type sensors adapted to detect movement of acoustic-reflective gesturing instruments, and infrared ("IR") type sensors.

* * * * *